United States Patent
Tanabe et al.

(10) Patent No.: US 7,370,473 B2
(45) Date of Patent: May 13, 2008

(54) EXHAUST GAS PURIFICATION DEVICE FOR INTERNAL COMBUSTION ENGINE

(75) Inventors: Ken Tanabe, Okazaki (JP); Hiroaki Ohhara, Anjo (JP); Kinichi Iwachido, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 11/433,431

(22) Filed: May 15, 2006

(65) Prior Publication Data

US 2006/0272318 A1 Dec. 7, 2006

(30) Foreign Application Priority Data

Jun. 6, 2005 (JP) .............................. 2005-165535

(51) Int. Cl.
*F01N 3/00* (2006.01)
(52) U.S. Cl. .............................. 60/286; 60/285; 60/295; 60/297; 60/301; 123/295
(58) Field of Classification Search .................. 60/285, 60/286, 295, 297, 301; 123/295, 305
See application file for complete search history.

(56) References Cited

U.S. PATENT DOCUMENTS

| | | | |
|---|---|---|---|
| 5,207,058 A | | 5/1993 | Sasaki et al. |
| 5,975,046 A | * | 11/1999 | Kaneko et al. ............. 123/300 |
| 6,109,024 A | * | 8/2000 | Kinugasa et al. ............. 60/285 |
| 6,374,596 B2 | * | 4/2002 | Taga et al. ..................... 60/277 |
| 6,560,960 B2 | * | 5/2003 | Nishimura et al. ........... 60/284 |
| 6,718,756 B1 | * | 4/2004 | Okada et al. ................. 60/286 |
| 6,976,356 B2 | * | 12/2005 | Okada et al. ................. 60/286 |

FOREIGN PATENT DOCUMENTS

| | | |
|---|---|---|
| DE | 19622832 A1 | 12/1996 |
| JP | 2002-4915 A | 1/2002 |

* cited by examiner

*Primary Examiner*—Binh Q. Tran
(74) *Attorney, Agent, or Firm*—Birch, Stewart, Kolasch & Birch, LLP.

(57) ABSTRACT

By performing main fuel injection and sub fuel injection to perform rich operation of an engine, NOx purging of a NOx catalyst is carried out, and in the NOx purging, the ratio between the main fuel injection quantity and the sub fuel injection quantity is variably determined, within the range of 5:1 to 2:1 where the ratio of the sub fuel injection quantity is relatively great, such that the ratio of the sub fuel injection quantity is greater as the temperature of a three-way catalyst becomes higher.

4 Claims, 5 Drawing Sheets

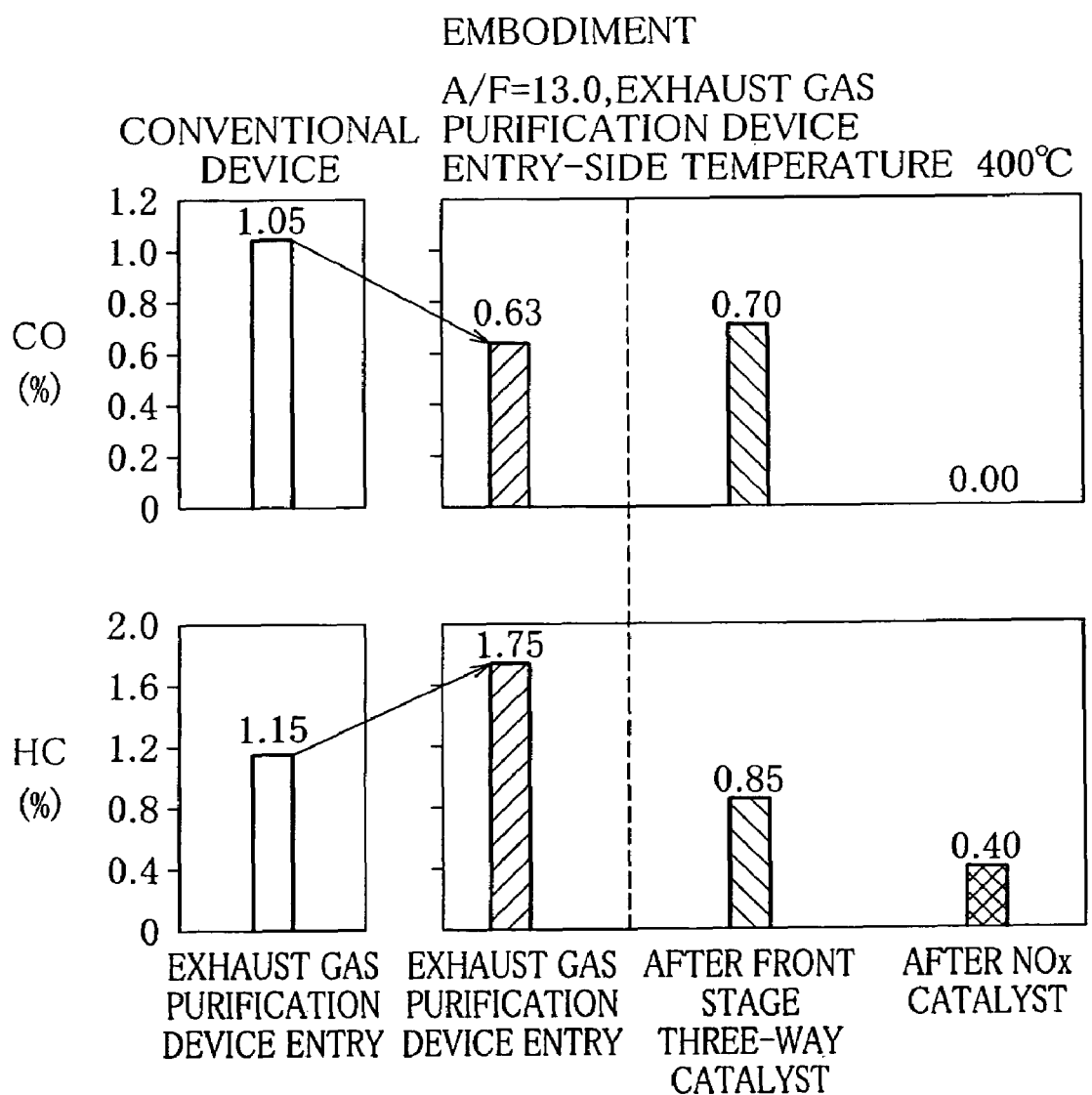

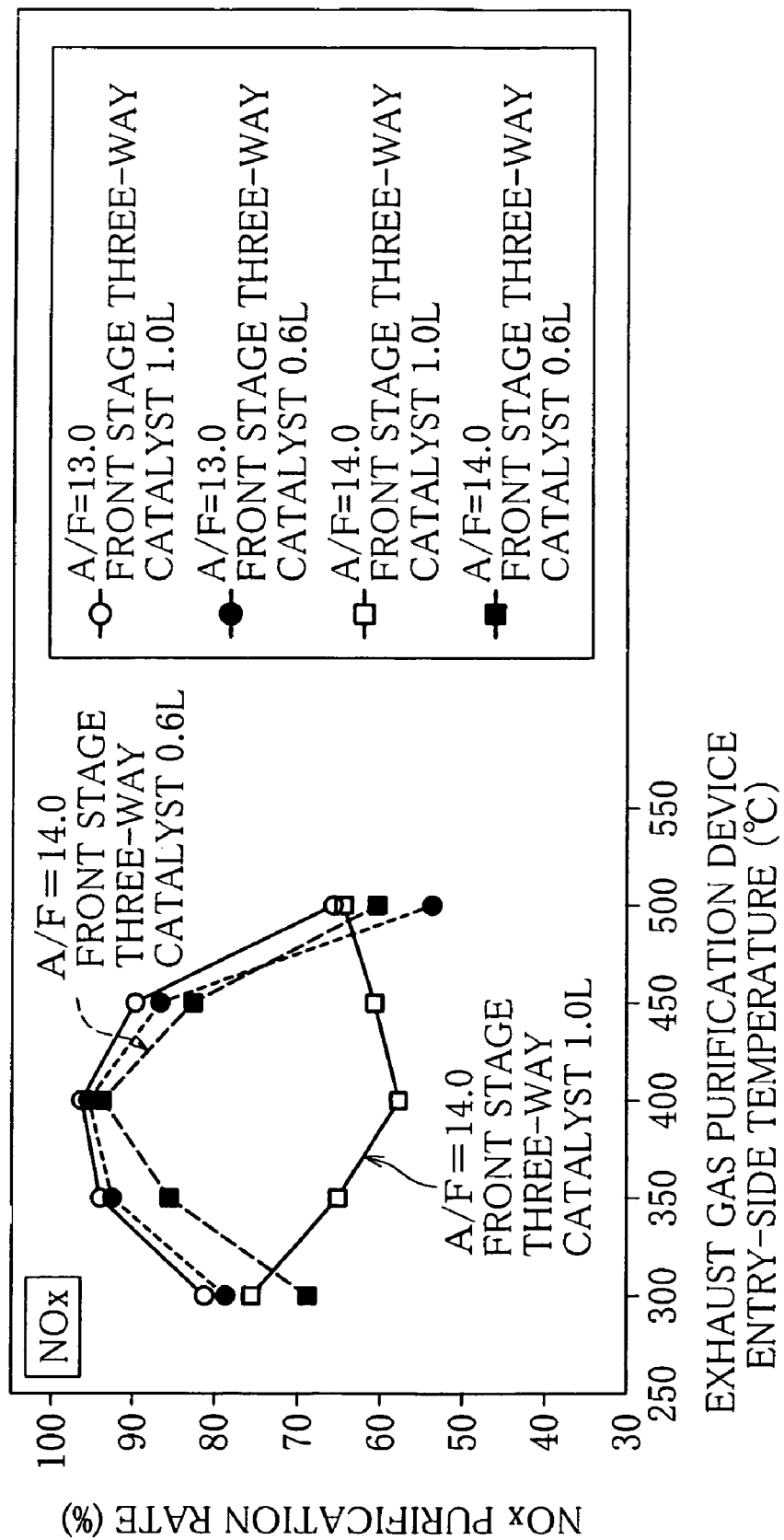

EXHAUST GAS PURIFICATION DEVICE FOR INTERNAL COMBUSTION ENGINE

BACKGROUND OF THE INVENTION

1. Field of the Invention

This invention relates to an exhaust gas purification device provided in an exhaust passage of an internal combustion engine to purify NOx contained in exhaust gas.

2. Description of the Related Art

In order to improve fuel consumption characteristics and exhaust gas characteristics, a lean burn engine such as an in-cylinder injection type engine is operated at a lean air-fuel ratio, i.e., an air-fuel ratio leaner than the stoichiometric air-fuel ratio in a specified operational region.

In such lean burn engine, while lean air/fuel ratio operation (hereinafter referred to as "lean operation") is being performed, NOx (nitrogen oxides) contained in exhaust gas is not purified in a sufficient manner only with a three-way catalyst. Hence, by providing a NOx catalyst, the emission of NOx into the atmosphere is reduced. The NOx catalyst absorbs NOx contained in exhaust gas in lean operation. The NOx catalyst discharges the absorbed NOx and purifies the NOx by reducing the NOx with a reducing agent (NOx purging) in stoichiometric air-fuel ratio operation (hereinafter referred to as "stoichiometric operation") or rich air-fuel ratio operation (hereinafter referred to as "rich operation").

When the three-way catalyst and the NOx catalyst are provided, in order to ensure a sufficient exhaust gas purification performance immediately after the internal combustion engine is started, the three-way catalyst is arranged in an upstream section of an exhaust passage of the internal combustion engine to become activated in early time.

When the three-way catalyst is arranged upstream of the NOx catalyst, however, a reducing agent such as HC or CO is purified by the three-way catalyst also during NOx purging, which causes a problem that NOx purging is not performed in a sufficient manner.

Thus, in order to perform NOx purging in a sufficient manner even when the three-way catalyst is arranged upstream of the NOx catalyst, techniques such as making the rich operation time longer, making the air-fuel ratio for the rich operation further richer, or injecting additional fuel after combustion of main fuel have been developed and proposed, for example, by Japanese Unexamined Patent Publication No. 2002-4915 (hereinafter referred to as "patent document 1").

However, making the rich operation time longer, or making the air-fuel ratio for the rich operation further richer as in the technique disclosed in patent document 1 causes a problem that the fuel economy of the internal combustion engine deteriorates to a great degree.

Further, the purification capacity of a catalyst changes depending on temperature, and there is a problem that as the three-way catalyst becomes more activated, the amount of reducing agents supplied to the NOx catalyst during NOx purging decreases, so that the exhaust gas purification performance of the NOx catalyst lowers.

SUMMARY OF THE INVENTION

An aspect of the present invention is an exhaust cleaning-up device provided in an internal combustion engine, comprising: a fuel injection means for injecting fuel directly into a combustion chamber of the internal combustion engine; a NOx catalyst arranged in an exhaust passage of the internal combustion engine to absorb NOx contained in exhaust gas in lean operation of the internal combustion engine, and discharge and reduce the absorbed NOx in stoichiometric or rich operation of the internal combustion engine; a three-way catalyst arranged upstream of the NOx catalyst in the exhaust passage; a catalyst temperature detection means for detecting or estimating the temperature of at least either of the NOx catalyst and the three-way catalyst; and a NOx purge control means for causing the NOx catalyst to discharge and reduce the absorbed NOx, by performing stoichiometric or rich operation of the internal combustion engine by controlling the fuel injection means to perform main fuel injection and sub fuel injection, the main fuel injection being performed in at least either of intake stroke and compression stroke and the sub fuel injection being performed in at least either of expansion stroke and exhaust stroke, wherein the NOx purge control means variably determines the ratio between the main fuel injection quantity and the sub fuel injection quantity depending on the temperature detected or estimated by the catalyst temperature detection means.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 5 is a graph showing CO concentration and HC concentration when NOx purge control is being performed in the exhaust gas purification device for the internal combustion engine of FIG. 1 and when conventional NOx purge control is being performed; and FIG. 6 is a graph showing how the capacity of a front stage three-way catalyst and the air-fuel ratio influence the NOx purification rate.

DETAILED DESCRIPTION OF THE INVENTION

Figure 1:
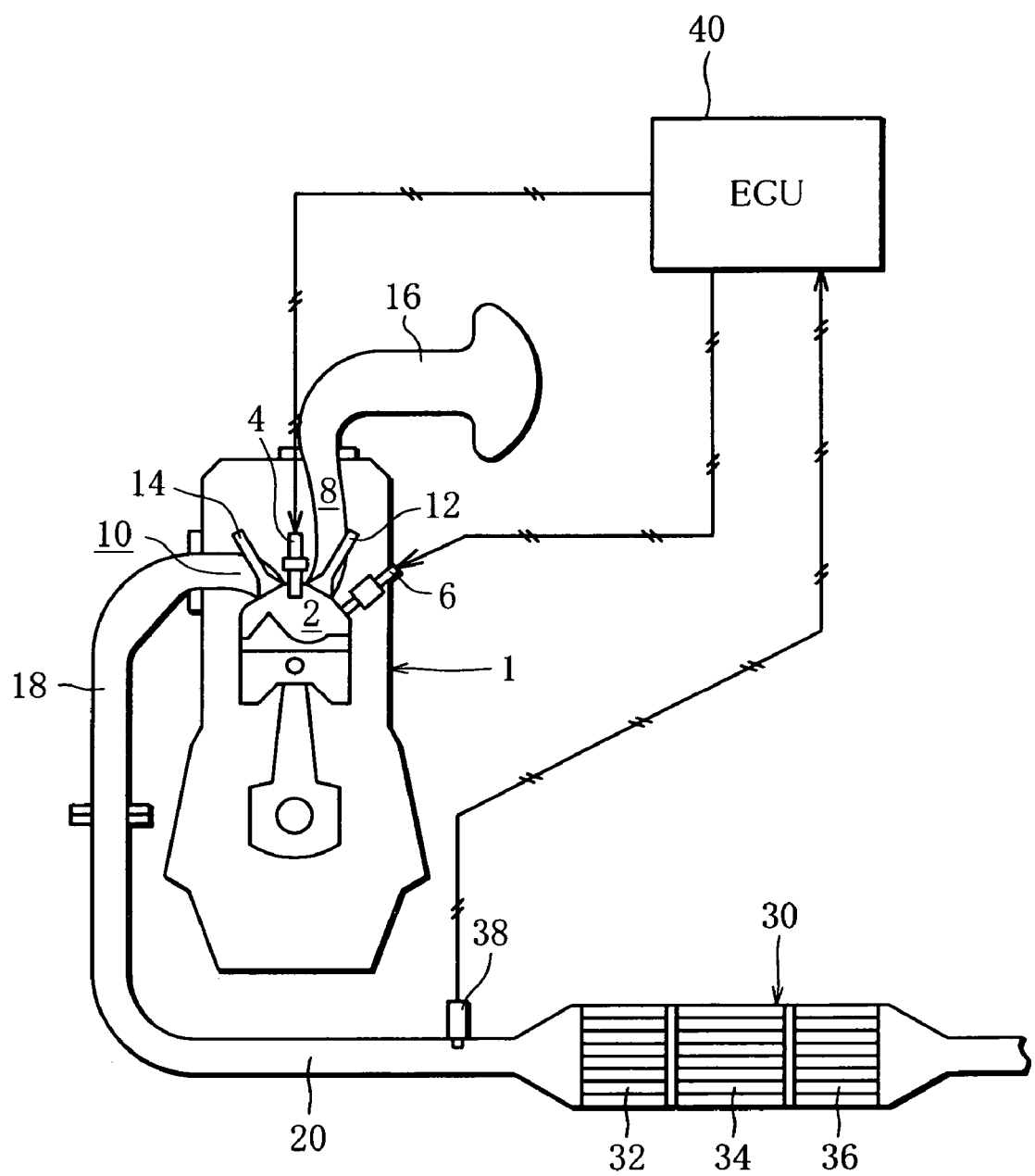
FIG. 1 is a diagram schematically showing the structure of an exhaust gas purification device for an internal combustion engine according to an embodiment of the invention.

Referring to the drawings, an embodiment of this invention will be described below.

FIG. 1 schematically shows the structure of an exhaust gas purification device for an internal combustion engine according to the invention.

As shown in FIG. 1, an engine 1 (internal combustion engine) is a so-called in-cylinder injection type engine having an injector 6 (fuel injection means) capable of injecting fuel directly into a combustion chamber 2 and a spark plug 4 for igniting fuel injected by the injector 6.

Although FIG. 1 shows one combustion chamber 2, the engine 1 comprises a plurality of cylinders (for example, 4 cylinders, 6 cylinders or the like), where each cylinder has a similar combustion chamber 2 provided with an injector 6 and a spark plug 4. The description below, which is made of one combustion chamber 2 as a representative, is applicable to the other combustion chambers 2, as a matter of course.

An intake port 8 extending almost parallel with the height of the engine 1 and an exhaust port 10 extending almost parallel with the width of the engine 1 are arranged to communicate with the combustion chamber 2.

The intake port 8 is provided with an intake valve 12, which establishes and breaks the connection between the combustion chamber 2 and the intake port 8. The exhaust port 8 is provided with an exhaust valve 14, which establishes and breaks the connection between the combustion chamber 2 and the exhaust port 8.

The intake port 8 is connected to an intake manifold 16, while the exhaust port 10 is connected to an exhaust manifold 18.

The exhaust manifold 18 is connected to an exhaust pipe 20, and an exhaust gas purification device 30 is arranged in the exhaust pipe 20.

In the exhaust gas purification device 30, a front stage three-way catalyst 32 (three-way catalyst), a NOx catalyst 34 and a rear stage three-way catalyst 36 are arranged in this order from the upstream side.

Specifically, the front stage three-way catalyst 32 and the rear stage three-way catalyst 36 have a function of oxidizing HC and CO contained in exhaust gas from the engine 1 and of reducing NOx also contained in the exhaust gas. The NOx catalyst 34 has a function of absorbing NOx contained in exhaust gas from the engine 1 when the engine 1 is in lean operation, and discharging and reducing the absorbed NOx, or in other words, performing so-called NOx purging when the engine 1 is in stoichiometric or rich operation.

Near the exhaust gas entry of the exhaust gas purification device 30, a temperature sensor 38 (catalyst temperature detection means) is arranged.

Various devices including the spark plugs 4 and the injectors 6 and various sensors including the temperature sensor 38 are electrically connected with an ECU (electronic control unit) 40 (NOx purge control means). The ECU 40 controls the operation of the devices on the basis of information from the sensors.

The function of the exhaust gas purification device for the internal combustion engine according to the present invention arranged as described above will be described below.

Figure 2:
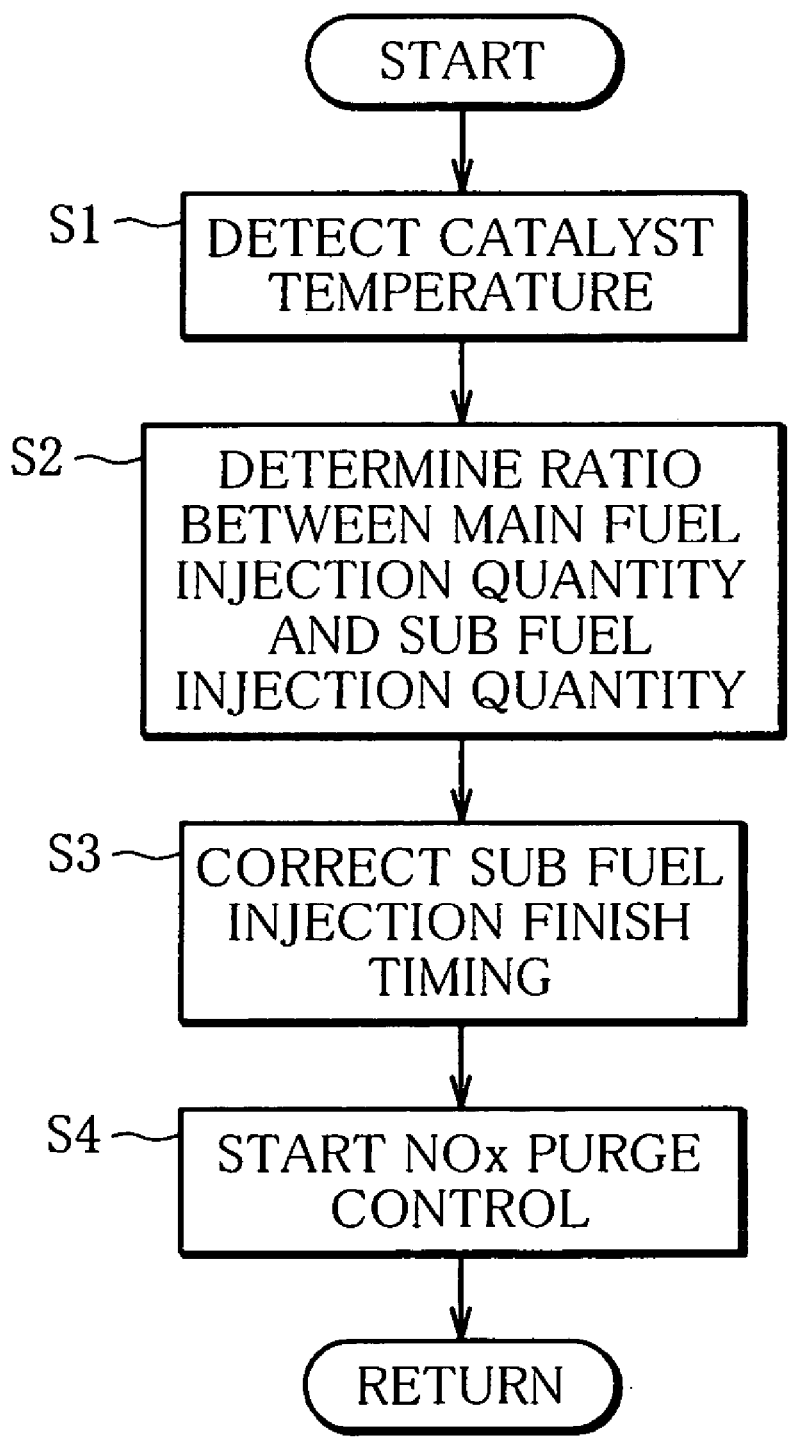
FIG. 2 is a flow chart showing a control routine for NOx purging in the exhaust gas purification device for the internal combustion engine of FIG. 1, which is executed by an ECU.

FIG. 2 is a flow chart showing a control routine for NOx purging in the exhaust gas purification device for the internal combustion engine according to the present invention, which is executed by the ECU 40.

The timing of NOx purging is determined depending on the operational conditions of the engine 1, etc. Here, as an example, every 30 seconds of lean operation, 2 seconds of rich operation at an air-fuel ratio (A/F) 13.0 is performed for NOx purging. This way of NOx purging will be hereinafter referred to as condition A.

As shown in FIG. 2, in NOx purging, first at step S1, the entry-side temperature of the exhaust gas purification device 30 is detected by the temperature sensor 38, and on the basis of this entry-side temperature, the temperature of each catalyst arranged in the exhaust gas purification device 30 is calculated. For example, the temperature of the front stage three-way catalyst 32 may be estimated to be substantially equal to the entry-side temperature of the exhaust gas purification device 30 detected by the temperature sensor 38, and the temperature of the NOx catalyst 34 may be estimated to be the entry-side temperature of the exhaust gas purification device 30 plus a specified temperature (100° C., for example).

Next, at step S2, the ratio between the amount of fuel injected in main fuel injection (referred to as "main fuel injection quantity") and the amount of fuel injected in sub fuel injection (referred to as "sub fuel injection quantity") in rich operation for NOx purging is determined.

Specifically, in rich operation for NOx purging, fuel injection is performed in a manner divided into main fuel injection in the intake stroke and sub fuel injection in the expansion stroke.

In the NOx purging on condition A, the ratio between the main fuel injection quantity and the sub fuel injection quantity is determined to be 2.5:1, for example. It is to be noted that the air-fuel ratio for NOx purging means the air-fuel ratio for overall fuel injection comprising main fuel injection and sub fuel injection. In the NOx purging on condition A, it is arranged such that 0.2 seconds after the start of rich operation, sub fuel injection is performed for 0.5 seconds, and that the overall air-fuel ratio for 2 seconds of NOx purging is 13.0.

It is to be noted that when the temperature of the front stage three-way catalyst 32 detected at step S1 is within the range of activation temperatures for the front stage three-way catalyst 32, the ratio between the main fuel injection quantity and the sub fuel injection quantity is determined within the range of 5:1 to 2:1 where the sub fuel injection quantity is relatively large.

Further, the ratio between the main fuel injection quantity and the sub fuel injection quantity is determined such that the higher the temperature of the preceding-stage three-way catalyst 32, the greater the ratio of the sub fuel injection quantity. Consequently, the exhaust gas from the engine 1 contains a larger amount of HC, as the temperature of the three-way catalyst becomes higher. Compared with the other reducing agents such as CO, HC is less easily purified by the front stage three-way catalyst 32. Hence, even when the front stage three-way catalyst 32 is activated, a sufficient amount of HC can be supplied to the NOx catalyst 34.

Then at step S3, the finishing timing of the sub fuel injection (referred to as "sub fuel injection finish timing") is corrected.

Specifically, the correction is made such that as the temperature of the front stage three-way catalyst 32 is higher, the sub fuel injection finish timing is retarded to a greater degree, although it is restricted by the condition that the fuel injected by the sub fuel injection should not be ignited by combustion of the fuel injected by the main fuel injection. Also as a result of this correction, exhaust contains a larger amount of HC as the temperature of the three-way catalyst 32 becomes higher.

In the NOx purging on condition A, the original sub fuel injection finish timing is set at 65° ATDC (after top dead center).

Then at step S4, NOx purge control is started with the fuel injection ratio and fuel injection timing determined at steps S2 and S3, with which the execution of this routine ends.

Figure 3:
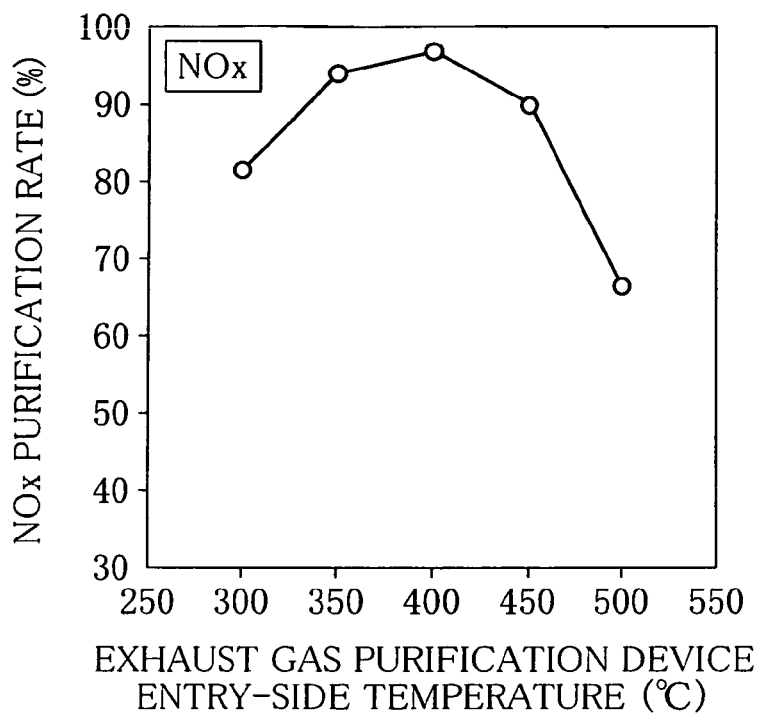
FIG. 3 is a graph showing relation between front stage three-way catalyst entry-side temperature and NOx purification rate when NOx purge control is performed in the exhaust gas purification device for the internal combustion engine of FIG. 1.
Figure 4:
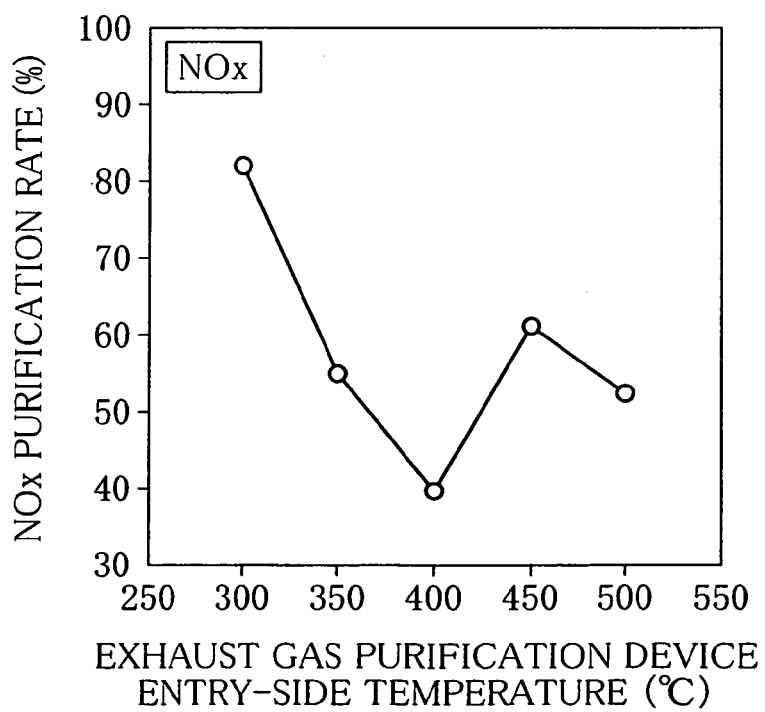
FIG. 4 is a graph showing relation between front stage three-way catalyst entry-side temperature and NOx purification rate when conventional NOx purge control is performed.

Here, let us see FIGS. 3 to 6. FIG. 3 is a graph showing relation between entry-side temperature of the front stage three-way catalyst 32 and NOx purification rate when NOx purge control in the present embodiment is performed. FIG. 4 is a graph showing relation between entry-side temperature of the front stage three-way catalyst 32 and NOx purification rate when conventional NOx purge control is performed. FIG. 5 is a graph showing CO concentration and HC concentration of exhaust gas when NOx purge control in the present embodiment is being performed and when conventional NOx purge control is being performed. It is to be noted that the conventional NOx purge control is performed on condition A, with a ratio between the main fuel injection quantity and the sub fuel injection quantity of 8.8:1 and a sub fuel injection finish timing of 89° ATDC.

Comparison between FIGS. 3 and 4 shows that when the ratio of the sub fuel injection quantity is increased as in the NOx purge control in the present embodiment, the NOx purification rate improves to a great degree.

Further, as FIG. 5 shows, when the conventional NOx purge control is being performed, the exhaust gas around the entry of the exhaust gas purification device 30 has a high CO concentration and a low HC concentration. Meanwhile, when the NOx purge control in the present embodiment is being performed, the exhaust gas around the entry of the exhaust gas purification device 30 has a low CO concentration and a high HC concentration.

Further, in the NOx purge control in the present embodiment, the exhaust gas has a low CO concentration around the entry of the exhaust gas purification device 30 and has a little increased CO concentration after the front stage three-way catalyst 32. From this, it is inferred that, although CO is originally more easily purified by the front stage three-way catalyst 32 than HC, when a large amount of HC comes to the front stage three-way catalyst 32, CO is produced from HC, so that the purification of CO by the front stage three-way catalyst 32 is suppressed.

Hence, as shown in FIG. 5, compared with the conventional NOx purge control, when the NOx purge control in the present embodiment is performed, a larger amount of HC, which is not easily purified by the three-way catalyst 32, is emitted from the engine 1, and also the amount of CO, which reacts well as a reducing agent in the presence of the NOx catalyst 34, increases. Thus, the reducing agents are supplied to the NOx catalyst 34 in a better manner.

Thus, even when the front stage three-way catalyst 32 is in an activated state, by variably determining the ratio between the main fuel injection quantity and the sub fuel injection quantity such that as the temperature of the preceding-stage three-way catalyst 32 becomes higher, the ratio of the sub fuel injection quantity increases, within the range of 5:1 to 2:1 where the ratio of the sub fuel injection quantity is relatively great compared with the conventional case, without changing the amount of fuel consumed in NOx purging, and by retarding the sub fuel injection finish timing to a greater degree as the temperature of the front stage three-way catalyst 32 becomes higher, a sufficient amount of reducing agents can be supplied to the NOx catalyst 34 so that the NOx purging can be performed in a good manner.

Thus, it is possible to improve the exhaust gas purification performance while suppressing the deterioration in fuel economy due to NOx purging.

In the above, the exhaust gas purification device for the internal combustion engine according to one embodiment of the present invention has been described. The present invention is, however, not limited to the described embodiment.

For example, the air-fuel ratio in rich operation for NOx purging is determined depending on the capacity of the front stage three-way catalyst 32. In the described embodiment, the capacity of the front stage three-way catalyst 32 is 1.0 L (1.0 liter). As shown in FIG. 6, if the capacity thereof is 0.6 L, even when the air-fuel ratio in rich operation for NOx purging is set at 14.0, a sufficiently high NOx purification rate can be achieved. Thus, when the capacity of the front stage three-way catalyst 32 is smaller, the air-fuel ratio in rich operation for NOx purging may be set at a value which causes less deterioration in fuel economy.

Further, NOx purging, which is performed by performing rich operation in the above-described embodiment, may be performed by performing stoichiometric operation.

Further, main fuel injection, which is performed in the intake stroke in the above-described embodiment, may be performed in the compression stroke, and sub fuel injection, which is performed in the expansion stroke in the above-described embodiment, may be performed in the exhaust stroke.

Further, although in the described embodiment, after 30 seconds of lean operation, 2 seconds of rich operation is performed for NOx purging, the way of NOx purging is not limited to this. NOx purging may be performed on another condition.

Further, in the described embodiment, 0.2 seconds after the start of rich operation, sub fuel injection is started, and the sub fuel injection period is 0.5 seconds. When the sub fuel injection period is determined to be shorter than the rich operation period, sub fuel injection may be started at any point within the rich operation period, although it is required that the sub fuel injection should finish within the rich operation period.

Further, although in the described embodiment, the catalyst temperature sensor 38 is provided in the vicinity of the exhaust gas entry of the exhaust gas purification device 30, the location of the catalyst temperature sensor 38 is not limited to this. It may be arranged at any place where the catalyst temperature can be detected. In that case, the temperature of the front stage three-way catalyst 32 and the temperature of the NOx catalyst 34 are obtained by correcting the detection output of the catalyst temperature sensor 38 depending on the location of the catalyst temperature sensor 38.

In place of using a device for directly detecting temperature like the catalyst temperature sensor 38, a device or calculation method for estimating the catalyst temperature from a parameter other than temperature in a known manner may be used.

Further, in the described embodiment, the ratio between the main fuel injection quantity and the sub fuel injection quantity is determined and the sub fuel injection finish timing is corrected on the basis of the temperature of the front stage three-way catalyst 32. The way of determining the above ratio and correcting the sub fuel injection finish timing is, however, not limited to this, but may be based on the temperature of the NOx catalyst 34, for example.

The rear stage three-way catalyst 36 is not absolutely necessary, but may be provided according to need.

The invention being thus described, it will be obvious that the same may be varied in many ways Such variations are not to be regarded as a departure from the spirit and scope of the invention, and all such modifications as would be obvious to one skilled in the art are intended to be included within the scope of the following claims.

What is claimed is:

1. An exhaust gas purification device for an internal combustion engine, comprising:
   fuel injection means for injecting fuel directly into a combustion chamber of the internal combustion engine;
   a NOx catalyst arranged in an exhaust passage of the internal combustion engine to absorb NOx contained in exhaust gas in lean operation of the internal combustion engine, and discharge and reduce the absorbed NOx in stoichiometric or rich operation of the internal combustion engine;

a three-way catalyst arranged upstream of the NOx catalyst in the exhaust passage;

catalyst temperature detection means for detecting or estimating the temperature of at least one of the NOx catalyst and the three-way catalyst; and NOx purge control means for causing the NOx catalyst to discharge and reduce the absorbed NOx, by performing stoichiometric or rich operation of the internal combustion engine by controlling the fuel injection means to perform main fuel injection and sub fuel injection, the main fuel injection being performed in at least one of intake stroke and compression stroke and the sub fuel injection being performed in at least one of expansion stroke and exhaust stroke at a timing that fuel injected by the sub fuel injection is not ignited by combustion of fuel injected by the main fuel injection, wherein the NOx purge control means variably determines a ratio between a main fuel injection quantity and a sub fuel injection quantity depending on the temperature detected or estimated by the catalyst temperature detection means.

2. The exhaust gas purification device for the internal combustion engine according to claim 1, wherein the NOx purge control means variably determines the ratio between the main fuel injection quantity and the sub fuel injection quantity within the range of 5:1 to 2:1.

3. The exhaust gas purification device for the internal combustion engine according to claim 1, wherein the NOx purge control means determines the ratio of the sub fuel injection quantity to the main fuel injection quantity to be greater as the temperature detected or estimated by the catalyst temperature detection means becomes higher.

4. The exhaust gas purification device for the internal combustion engine according to claim 1, wherein the NOx purge control means controls the fuel injection means so that the finishing timing of the sub fuel injection is retarded to a greater degree as the temperature detected or estimated by the catalyst temperature detection means becomes higher.

* * * * *